United States Patent [19]
Eino

[11] Patent Number: 4,803,562
[45] Date of Patent: Feb. 7, 1989

[54] IMAGE SENSING APPARATUS

[75] Inventor: Teruo Eino, Tokyo, Japan

[73] Assignee: Olympus Optical Co., Ltd., Tokyo, Japan

[21] Appl. No.: 62,098

[22] Filed: Jun. 11, 1987

[30] Foreign Application Priority Data

Jun. 20, 1986 [JP] Japan ................................ 61-144514
Jun. 20, 1986 [JP] Japan ................................ 61-144517

[51] Int. Cl.⁴ .......................... H04N 7/18; H04N 3/18
[52] U.S. Cl. ........................................ 358/98; 358/190;
    358/213.26; 128/4; 128/6; 323/223; 323/268
[58] Field of Search ................... 358/213.26, 98, 190,
    358/213.11, 213.31; 128/4, 6; 323/223, 225,
    256, 268, 271, 272

[56] References Cited

U.S. PATENT DOCUMENTS

| 4,402,311 | 9/1983 | Hattori ..................................... 128/4 |
| 4,519,391 | 5/1985 | Murakoshi ............................... 128/4 |
| 4,532,918 | 8/1985 | Wheeler .................................. 358/98 |
| 4,539,589 | 9/1985 | Danna et al. ........................... 358/98 |
| 4,667,230 | 5/1987 | Arakawa et al. ...................... 358/98 |
| 4,706,118 | 11/1987 | Kato et al. ............................. 358/98 |

Primary Examiner—James J. Groody
Assistant Examiner—John K. Peng
Attorney, Agent, or Firm—Ladas & Parry

[57] ABSTRACT

An electronic endoscope apparatus comprises an endoscope and a video processor unit. The video processor unit includes a drive pulse generator for generating vertical drive pulses, a power supply for generating a +16 V power supply voltage, and a video processor for sampling and holding an input image signal. The endoscope includes an insertion portion which incorporates a solid-state image sensing element using a CCD at its distal end portion, a manipulator portion, and a universal cord for connecting an electronic endoscope body to the video processor unit. An integrated circuit unit is incorporated near the solid-state image sensing element at the distal end portion of insertion portion. The integrated circuit unit includes voltage dividing resistors for voltage dividing a +16 V power supply voltage supplied from the power supply of the video processor unit into +8 V, +7 V, and +3 V power supply voltages, and emitter follower transistors connected between these power supply voltages and the power supply voltage terminals of the solid-state image sensing element. A delay line is incorporated in the manipulator portion. The delay line delays horizontal drive pulses generated from the video processor unit in accordance with a signal transmission delay time between the solid-state image sensing element and the video processor unit so that the timing of the image signal can always be matched with that of sample-and-hold pulses upon a sample-and-hold operation in the video processor unit.

14 Claims, 7 Drawing Sheets

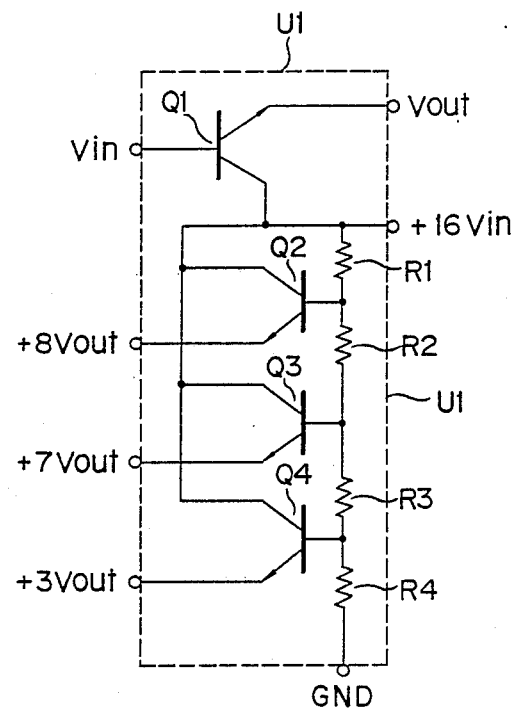
F I G. 4

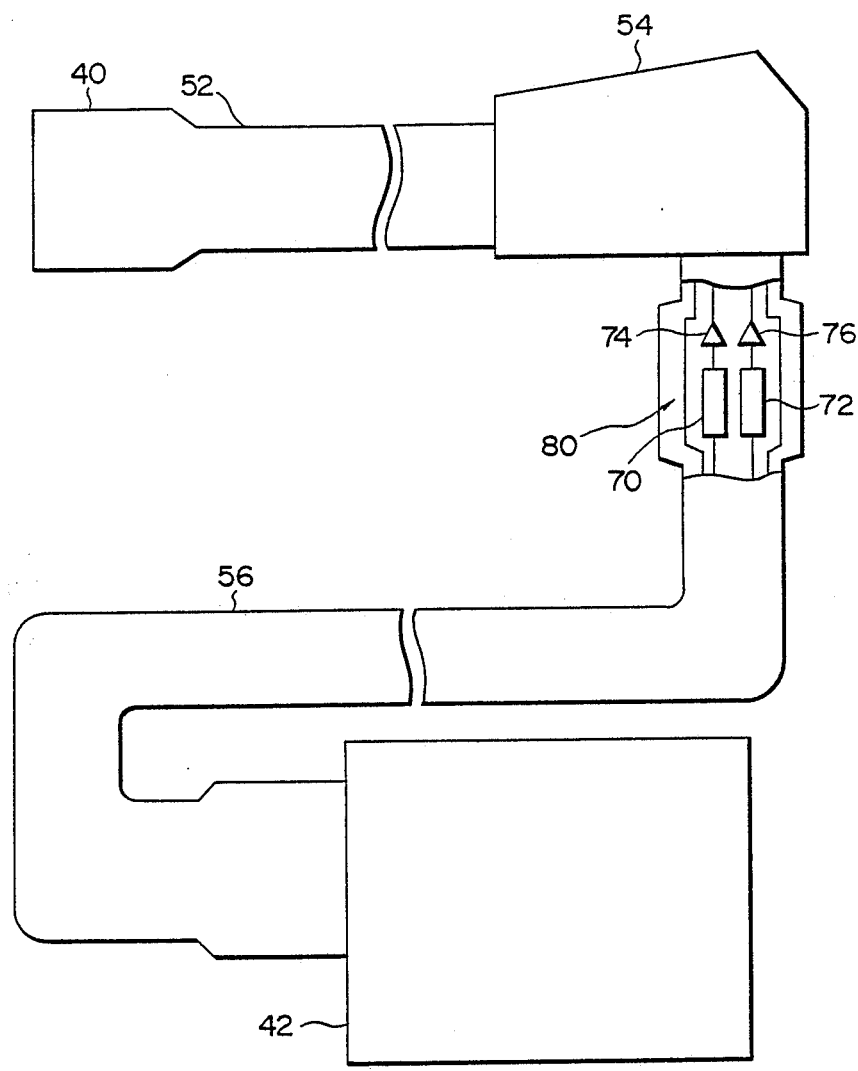
F I G. 7

IMAGE SENSING APPARATUS

BACKGROUND OF THE INVENTION

The present invention relates to an image sensing apparatus using a solid-state image sensing element such as a charge coupled device (CCD) and, more particularly, to an image sensing apparatus wherein a camera head unit and a video processor unit are separately arranged and are connected through a cable, a solid-state image sensing element and its peripheral circuit are arranged in the camera head unit, and a driver for the solid-state 10 image sensing element and a signal processor for processing an image signal output from the solid-state image sensing element to convert it into a video signal, are arranged in the video processor unit.

FIG. 1 is a plan view of solid-state image sensing element 10 using an interline transfer type CCD. A light-receiving portion of element 10 consists of photodiodes 16 arranged in a matrix. Charges generated from each array (vertical array) of photodiodes 16 are supplied to vertical transfer CCD 12 through read gate 18. Read gate 18 is connected to read gate terminal LG. A +3 V power supply voltage (DC voltage) is applied to terminal LG.

Vertical transfer CCD 12 is driven by a 4-phase clock signal consisting of vertical drive pulses $\phi V1$, $\phi V2$, $\phi V3$, and $\phi V4$, and charges generated from photodiodes 16 are read out and transferred at a predetermined timing. The charges transferred through CCD 12 are supplied to horizontal transfer CCD 14 for each horizontal scanning line.

CCD 14 transfers the charges supplied from CCD 12 for each scanning line. CCD 14 is driven in response to a 4-phase clock signal consisting of horizontal drive pulses $\phi H1$, $\phi H2$, $\phi H3$, and $\phi H4$.

Output gate 20 is connected to the output terminal of CCD 14, and receives a +7 V power supply voltage through output gate terminal OG. The signal charges 10 output through output gate 20 are supplied to the gate of output transistor 22 comprising a field effect transistor (FET). An image signal corresponding to the signal charges from photodiodes 16 can be output through the source of transistor 22 and signal output terminal Vout. A +16 V drain voltage is applied to the drain of output transistor 22 through output drain terminal OD.

The gate of transistor 22 is connected to the source of reset transistor 24 comprising an FET. After the image signals are output from photodiodes 16, the charges applied to the gate of transistor 22 are discharged from reset drain terminal RD through the drain of reset transistor 24 at a predetermined timing defined by reset pulses $\phi R$. A +16 V power supply voltage is also applied to reset drain terminal RD.

A 0 V power supply voltage is applied to P-well terminal PW of element 10, and a +8 V power supply voltage is applied to substrate bias terminal SUB.

In this manner, solid-state image sensing element 10 requires four types of power supply voltages, i.e., +16 V, +8 V, +7 V, and +3 V. When element 10 is arranged in the camera head unit, the four power supply voltages are obtained by voltage-dividing a single +16 V power supply voltage supplied from video processor unit 42, as shown in FIG. 2.

Camera head unit 40 incorporating element 10 is connected to video processor unit 42 having a power supply circuit, a video signal processor, and the like, through cable 38. Signal output terminal Vout of element 10 is connected to the base of output buffer transistor Q1, and the image signal is amplified and output from the emitter. The emitter output from transistor Q1 is transmitted to a video signal processor (not shown) in video processor unit 42 through an internal conductor of coaxial cable 46. The video signal processed by unit 42 is supplied to and is displayed on CRT monitor 44.

The outer conductor of coaxial cable 46 is grounded inside the unit 42.

A +16 V power supply voltage is applied to the collector of transistor Q1 from unit 42 through cable 38. Voltage dividing resistors R1, R2, R3, and R4 are connected in series with each other between the collector of transistor Q1 and the outer conductor (ground potential) of coaxial cable 46. The ratio of resistances of resistors R1, R2, R3, and R4 is set so that voltages at voltage dividing points are respectively +8 V, +7 V, and +3 V.

A +16 V voltage terminal (the collector of transistor Q1) is connected to reset drain terminal RD and output drain terminal OD of element 10. A +8 V voltage terminal (the node between resistors R1 and R2) is connected to substrate bias terminal SUB of element 10. A +7 V voltage terminal (the node between resistors R2 and R3) is connected to output gate terminal OG of element 10. A +3 V voltage terminal (the node between resistors R3 and R4) is connected to read gate terminal LG of element 10. A ground terminal (the outer conductor of coaxial cable 46) is connected to P-well terminal PW of element 10.

The +16 V, +8 V, +7 V, and +3 V voltage terminals are grounded (connected to the outer conductor of cable 46) through bypass capacitors C1, C2, C3, and C4, respectively. These capacitors C1, C2, C3, and C4 are impedance conversion elements for decreasing AC impedances of the voltage terminals of element 10, and must be arranged as near as possible to element 10.

According to the prior art apparatus, transistor Q1, resistors R1, R2, R3, and R4, and capacitors C1, C2, C3, and C4 are arranged near element 10. For this reason, even if these components are arranged using chip parts, a total of 9 parts are necessary. Therefore, even if these components are arranged on a single printed circuit board, they interfere with the reduction in size of camera head unit 40. This particularly poses a problem in an electronic endoscope which incorporates an image sensing element at its distal end portion.

If the video processor unit and the camera head unit are separately arranged, the following problems are also posed. Unit 42 supplies various drive pulses (clock pulses) to unit 40, and samples and holds discrete image signals for each pixel output from element 10 at a timing corresponding to the drive pulse to obtain an analogue continuous image signal. Cable 38 connecting units 42 and 40 delays a signal transmission time. Cables 38 having various lengths are prepared. Therefore, if the sample and hold timing is fixed, the timing of the clock pulses may be offset from the sample and hold timing in accordance with the length of cable 38.

In order to solve this problem, it can be considered that a plurality of delay circuits for delaying the drive pulses by various delay times corresponding to the various lengths of cables 38 and a selector for selecting one output from the delay circuits in accordance with the length of cable 38 and supplying the selected output to unit 40 are arranged in unit 42. However, with this method, the circuit arrangement of unit 42 is complicated and becomes bulky if a large number of cables 38 having different lengths are prepared. When the image sensing apparatus is applied to endoscopes, since endoscopes have cables of various lengths, this poses a serious problem.

SUMMARY OF THE INVENTION

The present invention has been made in consideration of the above situation, and an object of the invention is to provide a compact camera head unit in a solid-state image sensing apparatus in which the camera head unit incorporating a solid-state image sensing element which requires a plurality of power supply voltages and a video processor unit for supplying the power supply voltages to the solid-state image sensing element are separately arranged.

It is another object of the present invention to compensate for a signal transmission delay time between a video processor unit and a camera head unit.

According to the present invention, an image sensing apparatus comprises:

a video processor unit for generating a drive signal; and a camera head unit connected to the video processor unit, the camera head unit having a solid-state image sensing element which requires a plurality of power supply voltages and is operated in accordance with the drive signal supplied from the video processor unit to generate an image signal, and an emitter follower circuit or a source follower circuit connected to a power supply voltage terminal of the solid-state image sensing element, the plurality of power supply voltages being applied to the solid-state image-sensing element through the emitter follower circuit or the source follower circuit.

BRIEF DESCRIPTION OF THE DRAWINGS

FIG. 4 is a circuit diagram of an integrated circuit unit shown in FIG. 3;

FIG. 7 is a block diagram of an image sensing apparatus according to a third embodiment of the present invention.

DETAILED DESCRIPTION OF THE PREFERRED EMBODIMENTS

An image sensing apparatus according to an embodiment of the present invention will now be described with reference to the accompanying drawings.

Figure 1:
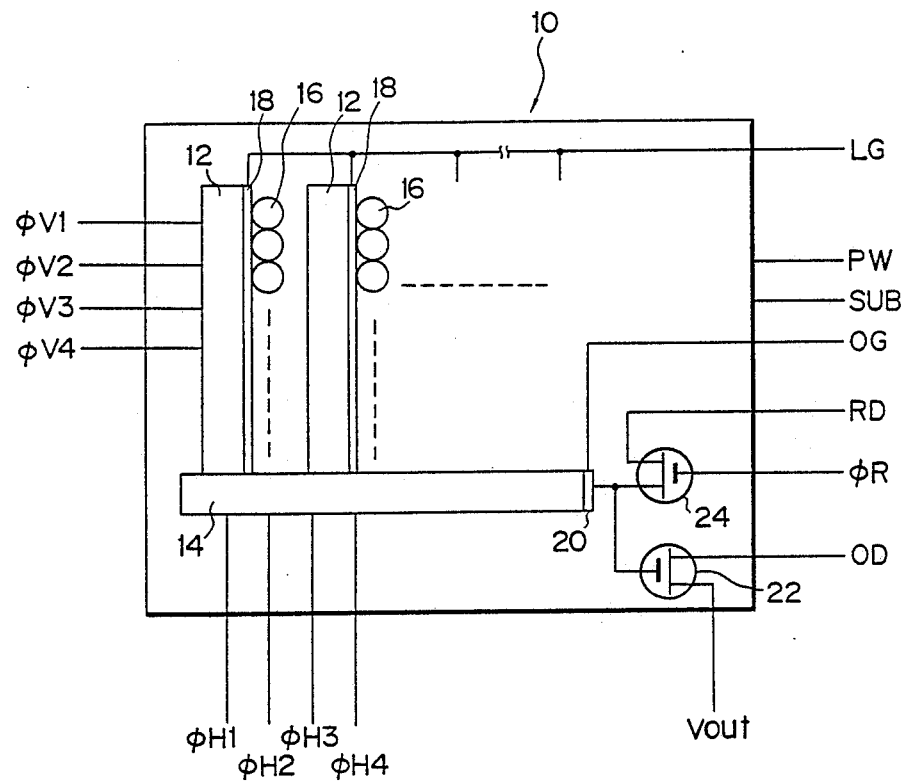
FIG. 1 is a plan view of a conventional interline transfer type CCD.
Figure 3:
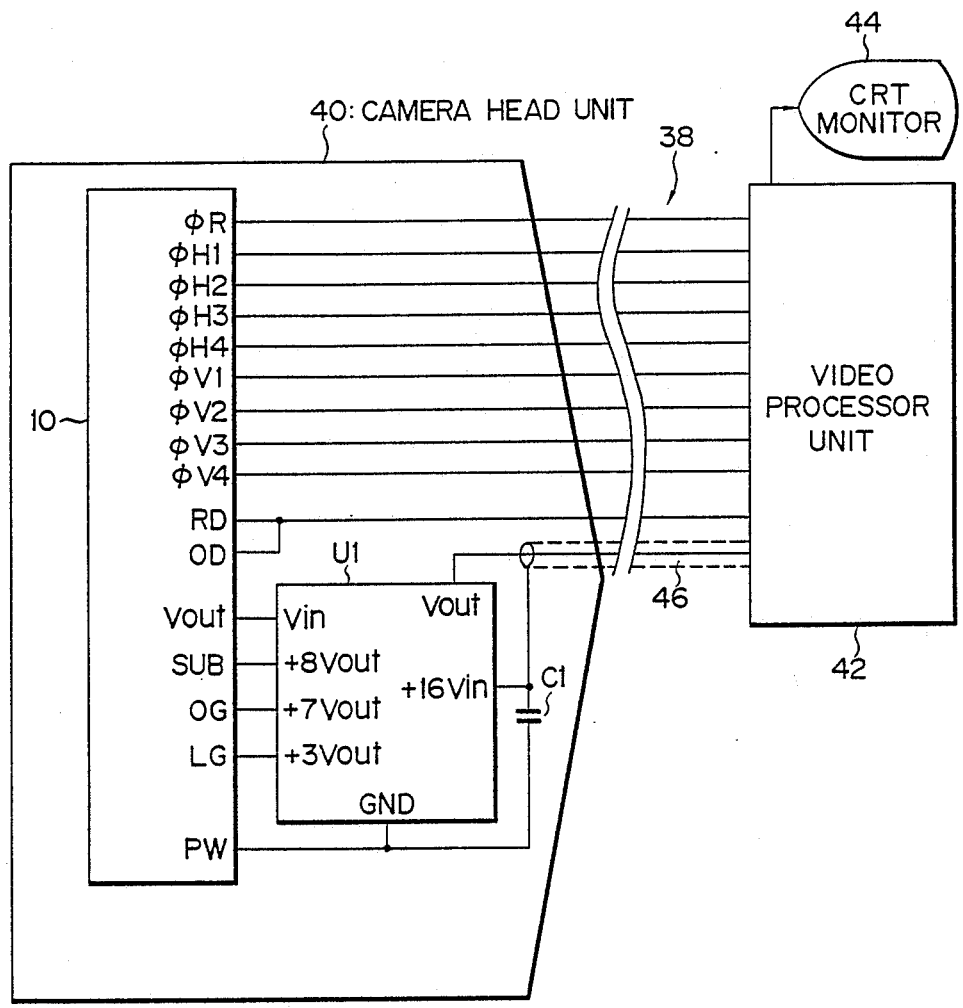
FIG. 3 is a block diagram of an image sensing apparatus according to a first embodiment of the present invention using the solid-state image sensing element shown in FIG. 1.

FIG. 3 is a block diagram of the first embodiment. An image sensing apparatus of the first embodiment has camera head unit 40, video processor unit 42, and cable 38 for connecting units 42 and 40. Unit 40 comprises solid-state image sensing element 10, integrated circuit unit U1, and capacitor C1. Element 10 utilizes an interline transfer type charge coupled device (CCD) shown in FIG. 1.

Figure 2:
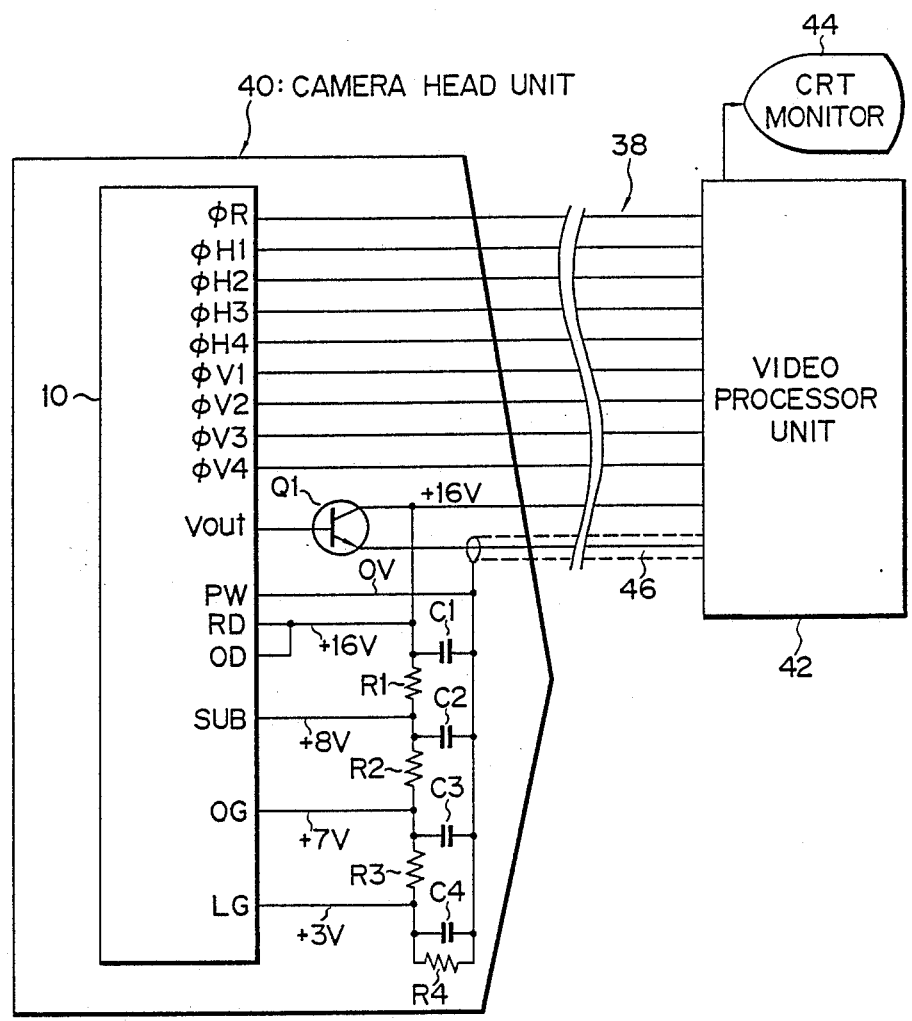
FIG. 2 is a block diagram of a conventional image sensing apparatus using a solid-state image sensing element shown in FIG. 1.

Integrated circuit unit U1 comprises emitter follower transistors Q1, Q2, Q3, and Q4, and voltage dividing resistors R1, R2, R3, and R4, as shown in FIG. 4. Transistor Q1 corresponds to output buffer transistor Q1 in the prior art shown in FIG. 2.

The collectors of transistors Q1, Q2, Q3 and Q4 serve as +16 Vin terminals, and receive a +16 V power supply voltage from video processor unit 42. The base of transistor Q1 serves as a Vin terminal, and is connected to signal output terminal Vout of element 10. The emitter of transistor Q1 serves as a Vout terminal, and is connected to the internal conductor of coaxial cable 46. The +16 Vin terminal is grounded (connected to the outer conductor of coaxial cable 46) and is connected to a GND terminal through external bypass capacitor C1.

Voltage dividing resistors R1, R2, R3, and R4 are connected in series with each other between the +16 Vin terminal and the GND terminal. The ratio of the resistances of the resistors is set so that the emitter voltages of the emitter follower transistors having bases receiving voltages at respective voltage dividing points are respectively +8 V, +7 V, and +3 V, unlike in the prior art shown in FIG. 2. In the prior art, the voltages at the voltage-dividing points (the base voltages of the emitter follower transistors) are set to be +8 V, +7 V, and +3 V.

The node between resistors R1 and R2 is connected to the base of transistor Q2. The emitter of transistor Q2 serves as a +8 Vout terminal, and is connected to substrate bias terminal SUB of element 10. The node between resistors R2 and R3 is connected to the base of transistor Q3. The emitter of transistor Q3 serves as a +7 Vout terminal, and is connected to output gate terminal OG of element 10. The node between resistors R3 and R4 is connected to the base of transistor Q4. The emitter of transistor Q4 serves as a +3 Vout terminal, and is connected to read gate terminal LG of element 10.

The GND terminal is connected to P-well terminal PW of element 10, and is grounded through bypass capacitor C1 and the outer conductor of cable 46.

According to this embodiment, since the +16 Vin terminal is grounded through bypass capacitor Cl, the output impedances of the +8 Vout, +7 Vout, and +3 Vout terminals, obtained by voltage-dividing a voltage at the +16 Vin terminal and output through emitter follower transistors Q2, Q3, and Q4, are sufficiently low. Therefore, bypass capacitors C2, C3, and C4 in the conventional arrangement can be omitted. For this reason, integrated circuit unit U1 and capacitor C1 need only be arranged near element 10. Therefore, there are only two components other than element 10, a significantly fewer number than the 9 components in the conventional arrangement, resulting in a compact camera head.

The apparatus of this embodiment is effective when it is applied to an electronic endoscope incorporating a solid-state image sensing element in its distal end portion.

According to this embodiment, in the image sensing apparatus in which the camera head unit and the video processor unit are separately arranged, a plurality of power supply voltages obtained by voltage-dividing a single power supply voltage supplied from the video processor unit inside the camera head unit are applied to the solid-state image sensing element through the emitter follower transistors. Therefore, bypass capacitors for decreasing the AC impedances of the power supply voltage terminals can be omitted, and a compact camera head unit can be provided.

Source follower FETs can be used in place of emitter follower transistors Q1, Q2, Q3, and Q4. In this case, the gate, the drain, and the source replace the base, collector and the emitter in the first embodiment.

The type of the solid-state image sensing element, the number of necessary power supply voltages, and the levels of the power supply voltages are not limited to the above description.

Figure 5:
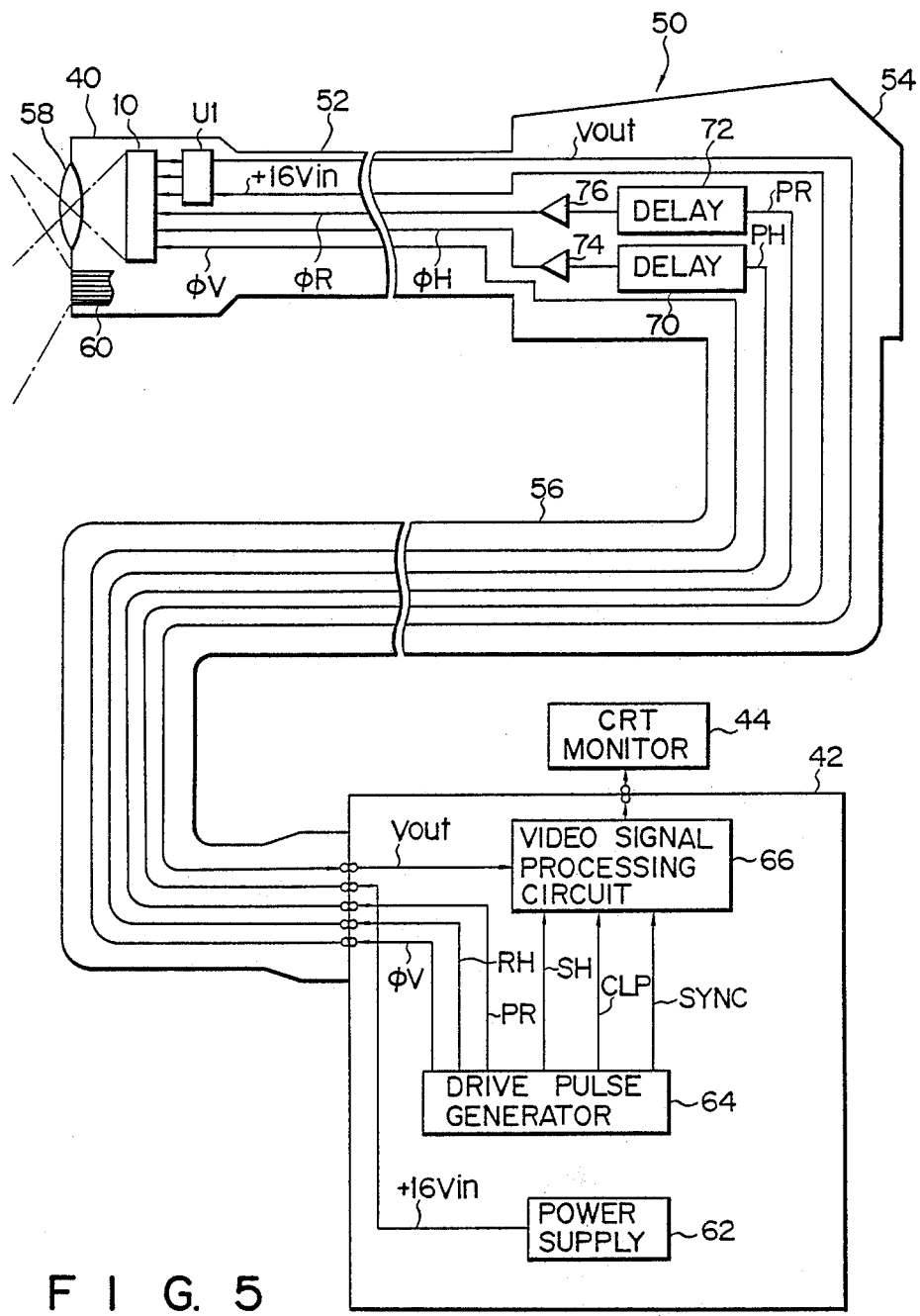
FIG. 5 is a block diagram of an image sensing apparatus according to a second embodiment of the present invention.

A second embodiment which is applied to an electronic endoscope will now be described. FIG. 5 is a block diagram of an electronic endoscope according to the second embodiment. The same reference numerals in the second embodiment denote the same parts as in the first embodiment. In this embodiment, the camera head unit is distal end portion 40 of electronic endoscope 50. Electronic endoscope 50 comprises distal end portion 40, insertion portion 52, manipulator portion 54, and universal cord 56 connected to video processor unit 42. Solid-state image sensing element 10 and integrated circuit unit U1 are arranged at the distal end portion 40. Objective lens 58 is arranged in front of image sensing element 10. Light guide fibers 60 for guiding light emitted from a light source toward an object is also incorporated in endoscope 50. Manipulator portion 54 has delay lines 70 and 72, and drivers 74 and 76.

Video processor unit 42 has power supply 62 for generating a +16 V voltage, drive pulse generator 64, and video signal processing circuit 66. The +16 V voltage generated from power supply 62 is supplied to integrated circuit unit U1 in endoscope 50, and is voltage-divided into a plurality of power supply voltages to be applied to element 10. Drive pulse generator 64 generates vertical drive pulses $\phi V$ (corresponding to $\phi V1$, $\phi V2$, $\phi V3$, and $\phi V4$ in the first embodiment), drive pulses PH and PR, sample and hold pulse SH, clamp pulse CLP, and sync pulse SYNC. Vertical drive pulses :V are supplied to element 10 in endoscope 50. Drive pulses PH and PR are supplied to delay lines 70 and 72 arranged in manipulator portion 54, and are delayed by a predetermined timing. The outputs from delay lines 70 and 72 are output through drivers 74 and 76, and respectively serve as horizontal drive pulses $\phi H$ (corresponding to $\phi H1$, $\phi H2$, $\phi H3$, and $\phi H4$ in the first embodiment) and reset pulse $\phi R$. These pulses are supplied to element 10.

Output Vout from element 10 is supplied to video processing circuit 66 in unit 42 through unit U1. Sample and hold pulse SH, clamp pulse CLP, and sync pulse SYNC generated from generator 64 are also supplied to processing circuit 66, and thus image signal Vout is video-processed.

Figure 6:
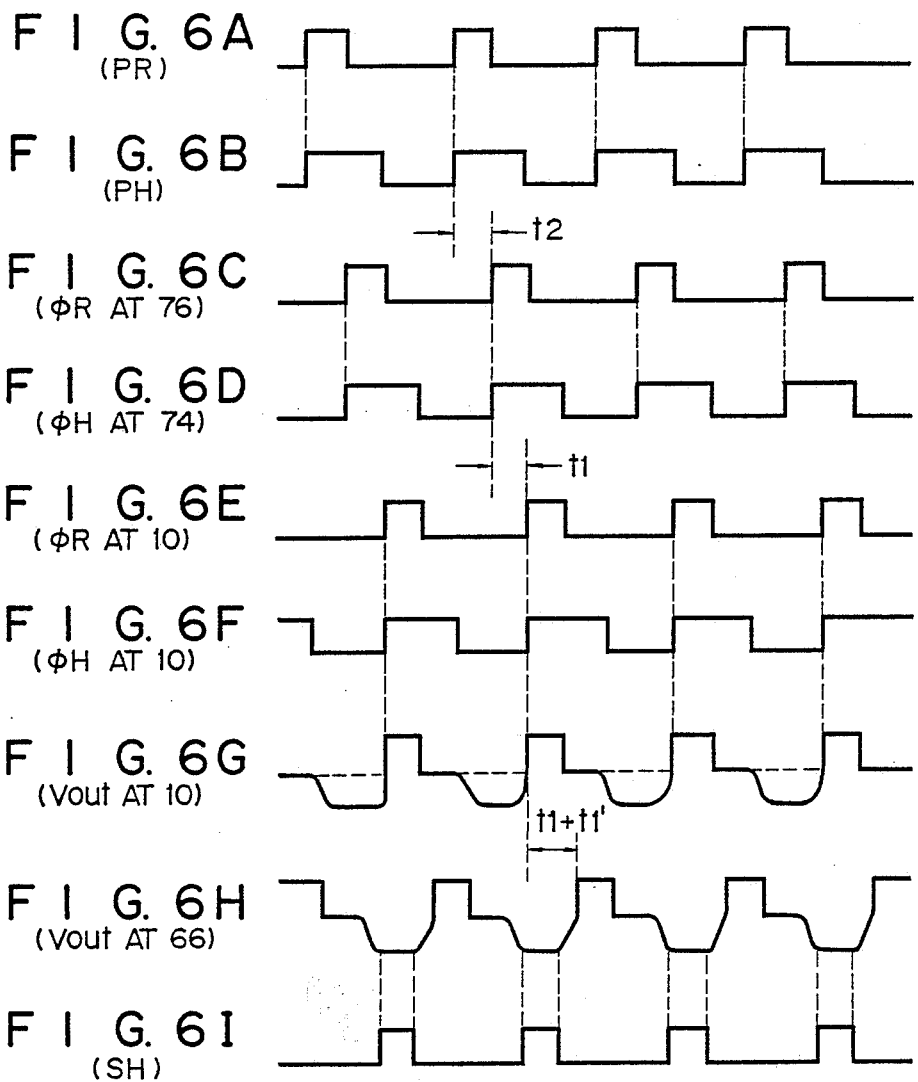
FIGS. 6A to 6I are timing charts for explaining the operation of the second embodiment.

The operation of the second embodiment will now be described with reference to FIGS. 6A to 6I. Generator 64 generates drive pulses PR and PH as shown in FIGS. 6A and 6B. Drive pulses PR and PH are supplied to delay lines 70 and 72 through universal cord 56. Delay lines 70 and 72 delay pulses PR and PH shown in FIGS. 6A and 6B by time t2. These signals are amplified by drivers 74 and 76 and are converted to reset pulse $\phi R$ and horizontal drive pulse $\phi H$, as shown in FIGS. 6C and 6D. In this embodiment, reset pulse $\phi R$ and horizontal drive pulse $\phi H$ are high-frequency pulses at a frequency of 7 MHz or higher, and the vertical drive pulse is a low-frequency pulse at a frequency of 15 KHz. Reset pulse $\phi R$ and horizontal drive pulse $\phi H$ generated from drivers 74 and 76 are delayed by time t1 as they are transmitted to element 10, as shown in FIGS. 6E and 6F. Time t1 corresponds to the length of insertion portion 52. The length of insertion portion 52 varies in accordance with the type of electronic endoscope.

Solid-state image sensing element 10 outputs image signal Vout shown in FIG. 6G in response to pulses $\phi R$ and $\phi H$.

Output image signal Vout from element 10 is delayed by time t1 as it is transmitted to the manipulator portion 54. Furthermore, the image signal is delayed by time t1' as it is transmitted from the manipulator portion 54 to video processing circuit 66. Time t1' corresponds to the length of universal cord 56. The length of universal cord 56 is constant regardless of the type of electronic endoscope. For this reason, time t1' is constant. As a result, image signal Vout is delayed by time t1+time t1' as it is transmitted from element 10 to processing circuit 66, as shown in FIG. 6H.

Image signal Vout is sampled and held by sample and hold pulse SH when it is signal-processed by processing circuit 66. Upon this sample and hold operation, only an effective signal component (output from the photodiodes) is extracted from image signal Vout, and a reset noise component and the like are removed therefrom. If sample and hold pulse SH and drive pulses PR and PH do not have a proper phase relationship, it's not possible to extract only the effective signal component alone. More specifically, if the length of the insertion portion of the electronic endoscope varies and hence time t1 varies, the phase of image signal Vout input to processing circuit 66 is shifted from that of sample and hold pulse SH, and image signal Vout cannot be properly sampled and held.

Thus, signals PH and PR are delayed in advance by time t2 by delay lines 70 and 72 so that t2+2t1 becomes constant. It is not necessary consider time t1', since it is constant due to the fact the length of universal cord 56 is constant. The delay times of the delay lines are determined in accordance with the length of insertion portion 52. Therefore, image signal Vout can be properly sampled and held.

According to this embodiment, transmission delay times between drive pulse generator 64 and solid-state image sensing element 10 and between element 10 and video processing circuit 66 can be compensated for by a simple arrangement. Since a delay circuit as a compensation means is arranged in the electronic endoscope, a compensation means for various types of endoscopes need not be arranged in the video processor unit. Therefore, the arrangement of the video processor unit can be simplified.

Note that not only horizontal drive pulses $\phi H$ but also vertical drive pulses $\phi V$ can be delayed. However, vertical drive pulse $\phi V$ relates to charge-readout from photodiode 16 and charge-transfer in vertical transfer CCD 12, as described in the description of the first embodiment. Therefore, it has no relationship to signal-processing in video signal processing circuit 66. It does not matter if the timing of vertical drive pulse $\phi V$ is offset depending on the length of insertion portion 52.

FIG. 7 is a block diagram of a third embodiment. The arrangement of the third embodiment is substantially the same as that of the second embodiment, except for the locations of delay lines 70 and 72. More specifically, delay lines 70 and 72 in the third embodiment are provided not in manipulator portion 54 of the electronic endoscope but near portion 54 in universal cord 56. In this embodiment, unit 80 for containing delay lines 70 and 72 and drivers 74 and 76 is arranged near portion 54 in universal code 56. With this arrangement, the same effect as described above can be attained, and manipulator portion 54 can be rendered compact.

The present invention is not limited to the above embodiments and various other changes and modifications may be made within the spirit and scope of the invention.

According to the present invention as described above, in an image sensing apparatus in which a camera head unit incorporating a solid-state image sensing element which requires a plurality of power supply voltages and a video processor unit are separately arranged, the video processor unit can be rendered compact. The signal transmission delay time between the video processor unit and the camera head unit can be compensated for by a simple arrangement.

What is claimed is:

1. An image sensing apparatus comprising:
video processor means for generating a drive signal; and
camera head means connected to said video processor means, said camera head means having
solid-state image sensing means which requires a plurality of power supply voltages for operating in response to the drive signal supplied from said video processor means so as to generate an image signal, and
emitter follower means connected to a power supply voltage terminal of said solid-state image sensing means, the plurality of power supply voltages being applied to said solid-state image sensing means through said emitter follower means.

2. An apparatus according to claim 1, in which
said video processor means comprises first power supply means for generating a single power supply voltage, and
said camera head means comprises second power supply means for generating a plurality of power supply voltages from the single power supply voltage.

3. An apparatus according to claim 2, in which
said second power supply means comprises voltage-dividing means for voltage-dividing said signal power supply voltage.

4. An apparatus according to claim 3, in which
said emitter follower means and said voltage-dividing means are formed by an integrated circuit.

5. An apparatus according to claim 3, in which
said emitter follower means comprises a plurality of transistors which have bases connected to voltage-dividing points of said voltage-dividing means and emitters connected to power supply terminals of said solid-state image sensing means.

6. An apparatus according to claim 5, in which
said second power supply means comprises a bypass capacitor connected between said single power supply voltage and a ground voltage.

7. An electronic endoscope apparatus comprising:
video processor means for generating a drive signal; and
an endoscope connected to said video processor means, said endoscope having
solid-state image sensing means which is arranged in a distal end portion of an insertion portion, requires a plurality of power supply voltages for operating in response to the drive signal supplied from said video processor means so as to generate an image signal, and
emitter follower means connected to a power supply voltage terminal of said solid-state image sensing element means, the plurality of power supply voltages being applied to said solid-state image sensing element means through said emitter follower means.

8. An apparatus according to claim 7, in which
said video processor means comprises first power supply means for generating a single power supply voltage, and
said camera head means comprises second power supply means for generating a plurality of power supply voltages from the single power supply voltage.

9. An apparatus according to claim 8, in which
said second power supply means comprises voltage-dividing means for voltage-dividing said signal power supply voltage.

10. An apparatus according to claim 9, in which
said emitter follower means and said voltage-dividing means are formed by an integrated circuit.

11. An apparatus according to claim 9, in which
said emitter follower means comprises a plurality of transistors which have bases or gates connected to voltage-dividing points of said voltage-dividing means and emitters or source connected to power supply terminals of said solid-state image sensing means.

12. An apparatus according to claim 11, in which
said second power supply means comprises a bypass capacitor connected between said single power supply voltage and a ground voltage.

13. An apparatus according to claim 7, in which
said endoscope comprises delay means for receiving the drive signal supplied from said video processor means, delaying the input drive signal in accordance with a signal transmission delay time between said distal end portion and said video processor means, and supplying the delayed drive signal to said solid-state image sensing means.

14. An apparatus according to claim 13, in which
said video processor means comprises means for sampling and holding the output image signal from said solid-state image sensing means,
a delay time of said delay means being determined in accordance with a length of a signal transmission path between said camera head means and said video processor means so as not to change a sample-and-hold timing of said sample-and-hold means for the image signal even if the signal transmission delay time between said camera head means and said video processor means changes.

* * * * *